United States Patent
Haydl et al.

(10) Patent No.: US 12,454,528 B2
(45) Date of Patent: Oct. 28, 2025

(54) PROCESS FOR THE PREPARATION OF PIPERIDINE COMPOUNDS

(71) Applicant: BASF SE, Ludwigshafen (DE)

(72) Inventors: Alexander Michael Haydl, Ludwigshafen (DE); Michael Schmitt, Ludwigshafen (DE); Klaus Becker, Ludwigshafen (DE); Dirk Bethke, Ludwigshafen (DE); Elena Capito', Pontecchio Marconi (IT); Johann-Peter Melder, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 726 days.

(21) Appl. No.: 17/785,828

(22) PCT Filed: Dec. 14, 2020

(86) PCT No.: PCT/EP2020/085947
§ 371 (c)(1),
(2) Date: Jun. 15, 2022

(87) PCT Pub. No.: WO2021/122441
PCT Pub. Date: Jun. 24, 2021

(65) Prior Publication Data
US 2023/0034961 A1    Feb. 2, 2023

(30) Foreign Application Priority Data
Dec. 16, 2019  (EP) .................................... 19216493

(51) Int. Cl.
C07D 403/14     (2006.01)

(52) U.S. Cl.
CPC ................. C07D 403/14 (2013.01)

(58) Field of Classification Search
CPC .................................................. C07D 403/14
USPC ........................................................ 514/245
See application file for complete search history.

(56) References Cited

U.S. PATENT DOCUMENTS

| | | | |
|---|---|---|---|
| 4,997,938 A | 3/1991 | Cantatore et al. | |
| 2010/0074083 A1 | 3/2010 | Shibuya et al. | |

FOREIGN PATENT DOCUMENTS

| | | |
|---|---|---|
| EP | 0455588 A1 | 11/1991 |
| EP | 0729947 A1 | 9/1996 |
| WO | 2012/052377 A1 | 4/2012 |

OTHER PUBLICATIONS

European Search Report for EP Patent Application No. 19216493.7, Issued on Jun. 16, 2020, 3 pages.
International Search Report for PCT Patent Application No. PCT/EP2020/085947, Issued on Mar. 16, 2021, 3 pages.
Jin et al., "Synthesis of Hindered Amine Light Stabilizer Chimassorb 119," Chinese Journal of Synthetic Chemistry, vol. 24, 2016, No. 10, p. 903-906. (English Abstract).

*Primary Examiner* — Kristin A Vajda

(74) *Attorney, Agent, or Firm* — ArentFox Schiff LLP

(57) ABSTRACT

The present invention relates to process for the preparation of a compound of formula (1), wherein $R_1$ and $R_2$ are independently from each other $C_1$-$C_8$alkyl, which comprises reacting a compound of formula (2), with a formaldehyde source in presence of a palladium or platinum catalyst at a hydrogen pressure of $5 \times 10^8$ mPa to $200 \times 10^8$ mPa.

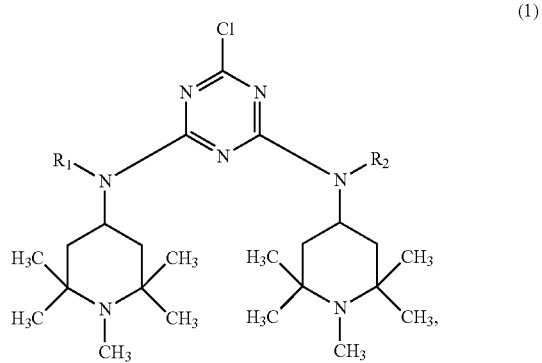

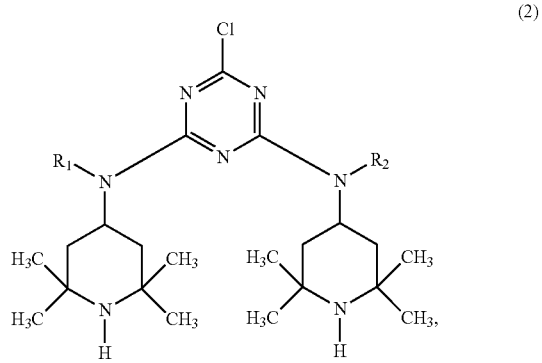

18 Claims, No Drawings

PROCESS FOR THE PREPARATION OF PIPERIDINE COMPOUNDS

CROSS-REFERENCE TO RELATED APPLICATIONS

This application is a National Stage Entry of PCT/EP2020/085947, filed Dec. 14, 2020, which claims priority to EP Application Serial No. 19216493.7, filed Dec. 16, 2019, the disclosures of each of which are hereby incorporated by reference in their entirety.

The present invention relates to a process for the preparation of N-methylated piperidine-containing compounds of formula (1) as given hereinafter, by reacting corresponding NH piperidine-containing compounds of formula (2) with a formaldehyde source in presence of a palladium or platinum catalyst at a hydrogen pressure of $5\times10^8$ mPa to $200\times10^8$ mPa.

Compounds of formula (1) find use in the preparation of hindered amine light stabilizers (so-called HALS), which in turn are used for the stabilization of plastics against degradation induced by light, heat or oxidation. Examples of such HALS are those of formulae (3) and (5) given hereinafter.

A common process for the N-methylation of piperidine compounds is disclosed in EP-A-729 947, according to which the N-methylation is carried out with formaldehyde and formic acid (Eschweiler-Clarke reaction). Since usually an excess of formic acid is used, and the reaction is followed by a neutralization step with a base, the process results in the generation of a certain amount of waste.

Processes for the N-alkylation of amine derivatives by transition metal catalyzed reductive amination with hydrogen and an aldehyde source are generally known, but would be expected to result in dehalogenation reactions if applied to compounds comprising halogen-triazines, like those of formula (2).

It has now been found that according to the process of the present invention corresponding dehalogenation reactions can be reduced to a minimum and the compounds of formula (1) can be prepared in high yields. The catalysts can easily be recovered, and the generation of waste is minimized.

Accordingly, the present invention is directed to a process for the preparation of a compound of formula

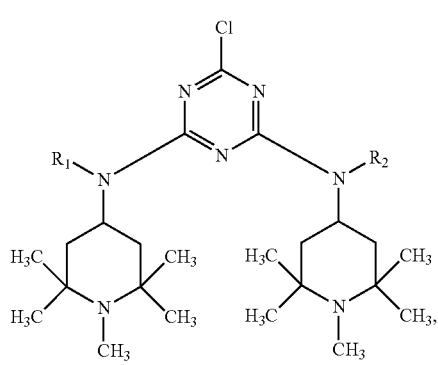

(1)

wherein $R_1$ and $R_2$ are independently from each other $C_1$-$C_8$alkyl, which comprises reacting a compound of formula

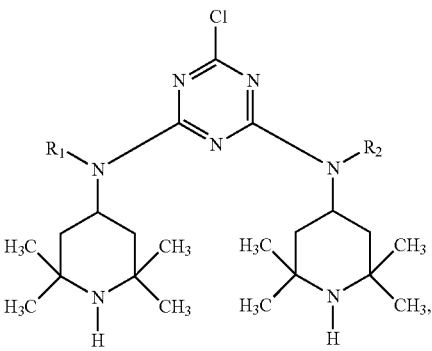

(2)

with a formaldehyde source in presence of a palladium or platinum catalyst at a hydrogen pressure of $5\times10^8$ mPa to $200\times10^8$ mPa.

$R_1$ and $R_2$ are preferably independently from each other $C_1$-$C_4$alkyl, especially butyl. Highly preferred is n-butyl.

The term formaldehyde source is used for compounds that releases formaldehyde for further reaction.

Examples of formaldehyde sources are paraformaldehyde, formaldehyde and methanol. Preferred are paraformaldehyde and formaldehyde, especially paraformaldehyde. Formaldehyde is preferably used in the form of formalin (aqueous solution of formaldehyde; for example corresponding 30 to 40 weight-% solutions, optionally stabilized with methanol).

Usually the molar ratio of formaldehyde source to compound of formula (2) is 1:1 to 10:1, especially 1:1 to 5:1 and more preferably 1:1 to 3:1.

Preference is given to a hydrogen pressure of $10\times10^8$ mPa to $150\times10^8$ mPa, especially $20\times10^8$ mPa to $150\times10^8$ mPa. According to one embodiment of the present invention the hydrogen pressure is $10\times10^8$ mPa to $50\times10^8$ mPa, especially $20\times10^8$ mPa to $50\times10^8$ mPa.

Preferably, the process is carried out at temperatures of 50 to 180° C., especially 80 to 150° C. Highly preferred are temperatures of 90 to 140° C.

The process can be carried out with or without a solvent. As a rule, the process is carried out in presence of a solvent, like water or an organic solvent. Examples of organic solvents are aliphatic solvents, aromatic solvents and alcohols, like pentane, hexane, heptane, octane, decane, cyclopentane, cyclohexane, methylcyclohexane, petroleum ether, benzene, toluene, xylene, ethylbenzene, cumene, bromo benzene, chlorobenzene, dichlorobenzene, furan, methanol, ethanol, n-propanol and isopropanol, preferably hexane, methanol, toluene and xylene.

Preferred as solvents are water, hexane, methanol, toluene and xylene, preferably methanol, toluene and xylene. Highly preferred are toluene and xylene, especially xylene.

The amount of the solvent which may be used for the inventive process is for example 10 to 95 weight-%, especially 20 to 90 weight-%, and more preferably 40 to 90 weight-%, based on the weight of the reaction mixture. Highly preferred is an amount of 40 to 90 weight-%.

It is preferred to use supported palladium (Pd) or platinum (Pt) catalysts. These usually comprise Pd or Pt in the elemental state supported on a suitable carrier. Any known carrier material, like carbon, calcium carbonate, aluminium oxide, titanium dioxide or natural or synthetic zeolite, especially carbon, can be used.

Preference is given to palladium or platinum catalysts supported on a carbon carrier.

In general, according to one embodiment of the present invention palladium catalysts, like those supported on a carbon carrier, are used. Likewise, according to a further embodiment of the present invention platinum catalysts, like those supported on a carbon carrier, are used.

The amount of palladium or platinum in such supported catalysts is for example 0.1 to 20 weight-%, especially 1 to 20 weight-%, based on the weight of the supported catalyst. Highly preferred is an amount of 2 to 15 weight-%.

The amount of the catalyst to be used for the inventive process is for example 0.5 to 20 weight-%, especially 2 to 15 weight-%, based on the weight of the compound of formula (2).

The process according to the present invention can be conducted continuously or non-continuously, for example batchwise.

The reaction time depends on the reaction conditions and may, for example, be 2 to 40 hours, especially 6 to 40 hours. Preferred upper limits are 24 hours and more preferably 12 hours.

As to such embodiment the definitions and preferences given hereinbefore shall apply.

Compounds of formula (2) are known and can, for example, be prepared according to EP 455 588, Example 1 A).

The mixture obtained after preparation of the compound of formula (1) may be used directly for further conversions of the compound of formula (1), usually after separation of the catalysts. Further purification steps are not required.

Compounds of formula (1) prepared according to the inventive process may be used for the preparation of HALS, like those of the following formulae (3) and (5)

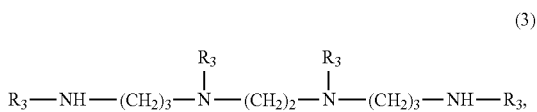

(3)

wherein $R_3$ is a group of formula

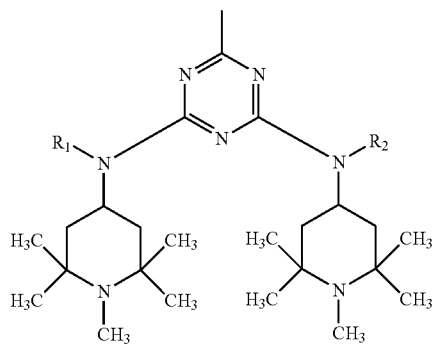

(4)

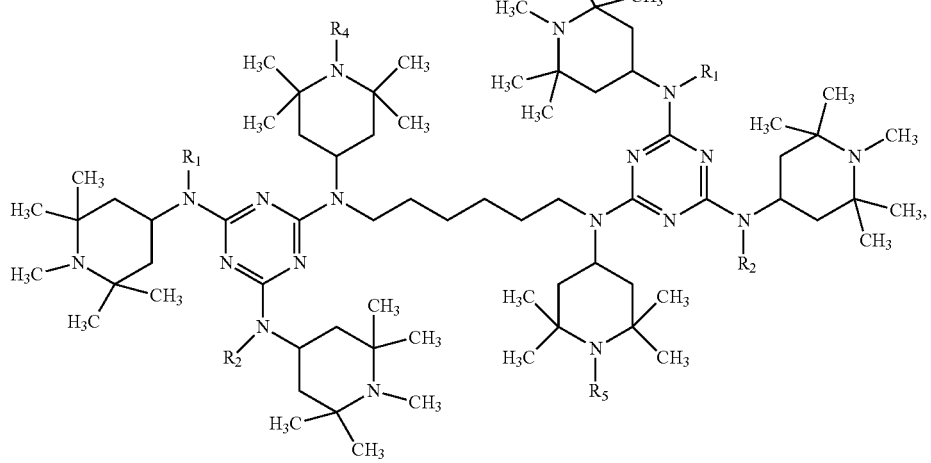

(5)

According to a preferred embodiment of the present invention a compound of formula (2), wherein $R_1$ and $R_2$ are n-butyl, is reacted with paraformaldehyde or formaldehyde in presence of a palladium or platinum catalyst supported on a carbon carrier and a solvent, like water, methanol, toluene or xylene, at a hydrogen pressure of $10 \times 10^8$ mPa to $150 \times 10^8$ mPa and a temperature of 80 to 150° C.

wherein $R_1$ and $R_2$ are as defined hereinbefore, and $R_4$ and $R_5$ are hydrogen or methyl.

Compounds of formula (3) are commercially available, i.e. as Chimassorb® 119, and may be obtained by preparing a compound of formula (1) according to the inventive process and reacting such compound of formula (1) with a compound of formula $NH_2-(CH_2)_3-NH-(CH_2)_2-NH-(CH_2)_3-NH_2$ (6).

The reaction is preferably carried out in in an aromatic hydrocarbon solvent, for example toluene, xylene or trimethylbenzene, operating at temperatures of 50 to 200° C., preferably 100 to 200° C. The hydrochloric acid set free in the reaction is preferably neutralized with an inorganic base, for example with sodium or potassium hydroxide or carbonate in a quantity at least equivalent to the acid set free.

Compounds of formula (5) may be obtained by preparing a compound of formula (1) according to the inventive process and reacting such compound of formula (1) with a compound of formula

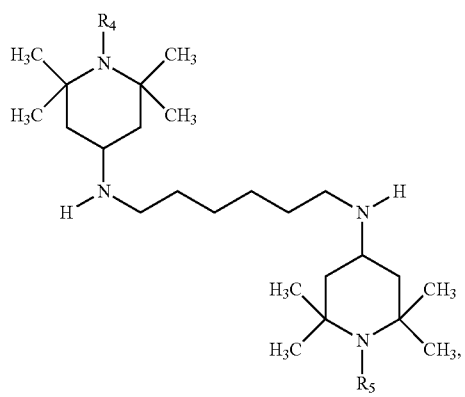

(7)

wherein $R_4$ and $R_5$ are hydrogen or methyl.

The reaction conditions for the preparation of the compound of formula (5) may correspond to those given above for the compound of formula (3).

The compounds of formulae (3) and (5) are efficient stabilizers for organic materials against the harmful effect of light and heat—especially for synthetic polymers like polyolefins. For example, films, like agricultural films, produced from polyolefins are stabilized by hindered amine stabilizers in order to improve the long-term stability of the films.

EXAMPLES

Example 1: Preparation of the Compound of Formula (102)

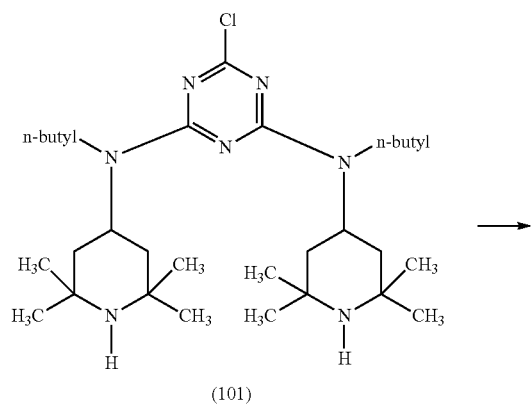

(101)

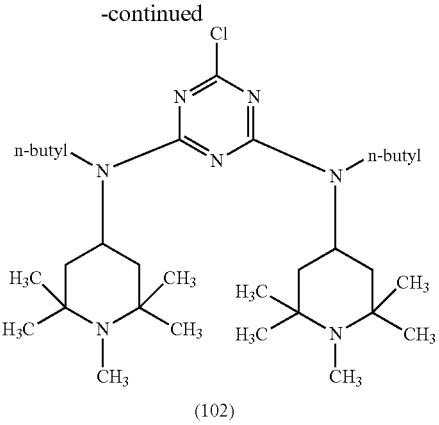

(102)

A steel-pressure autoclave is sequentially charged with 0.8 g Pd/C (5 weight-% Pd, based on the weight of the Pd/C catalyst; 4.9 weight-% of Pd/C with respect to the weight of the compound of formula (101)), 2.3 g of paraformaldehyde (76.7 mmol) and 60.0 g of a 27 weight-% solution of the compound of formula (101) in xylene (30.2 mmol of the compound of formula (101)). After purging the reaction vessel with nitrogen, the system is heated to 100° C., pressurized with $30 \times 10^8$ mPa hydrogen gas at this temperature and stirred for 24 hours. After complete reaction the system is vented, purged with nitrogen and cooled to room temperature to give the target compound of formula (102) in a yield of 97.1%.

Example 2

Example 1 is repeated, but using a hydrogen pressure of $20 \times 10^8$ mPa (instead of $30 \times 10^8$ mPa). The compound of formula (102) is obtained in a yield of 96.7%.

Example 3

Example 1 is repeated, but using a hydrogen pressure of $180 \times 10^8$ mPa (instead of $30 \times 10^8$ mPa). The compound of formula (102) is obtained in a yield of 97.4%.

Example 4

Example 1 is repeated, but using a hydrogen pressure of $20 \times 10^8$ mPa (instead of $30 \times 10^8$ mPa), and an equimolar amount of a 37 weight-% aqueous formaline solution (instead of 2.3 g of paraformaldehyde). The compound of formula (102) is obtained in a yield of 97.1%.

Example 5

Example 1 is repeated, but using a hydrogen pressure of $180 \times 10^8$ mPa (instead of $30 \times 10^8$ mPa), a reaction time of 12 hours (instead of 24 hours) and 10 weight-% of Pd/C (instead of 4.9 weight-% of Pd/C). The compound of formula (102) is obtained in a yield of 98.8%.

Example 6

Example 1 is repeated, but using a hydrogen pressure of $100 \times 10^8$ mPa (instead of $30 \times 10^8$ mPa) and 10 weight-% of Pt/C (instead of 4.9 weight-% of Pd/C). The compound of formula (102) is obtained in a yield of 96.3%.

Example 7

Example 1 is repeated, but using a reaction temperature of 130° C. (instead of 100° C.), an equimolar amount of a 37 weight-% aqueous formaline solution (instead of 2.3 g of paraformaldehyde) and 10 weight-% of Pt/C (instead of 4.9 weight-% of Pd/C). The compound of formula (102) is obtained in a yield of 96.7%.

In all of Examples 1 to 7 no dehalogenated by-products can be detected.

Comparative Example 1: Preparation with Raney Cu as Catalyst

Example 1 is repeated, but using 10 weight-% of Raney Cu (instead of 4.9 weight-% of Pd/C). The compound of formula (102) is obtained in a yield of 9.6%.

Comparative Example 2: Preparation with Raney Co as Catalyst

Example 1 is repeated, but using 10 weight-% of Raney Co (instead of 4.9 weight-% of Pd/C). The compound of formula (102) is obtained in a yield of 2.5%.

Comparative Example 3: Preparation with Raney Ni as Catalyst

Example 1 is repeated, but using 10 weight-% of Raney Ni (instead of 4.9 weight-% of Pd/C). The compound of formula (102) is obtained in a yield of 8.0%.

The invention claimed is:

1. A process for the preparation of a compound of formula

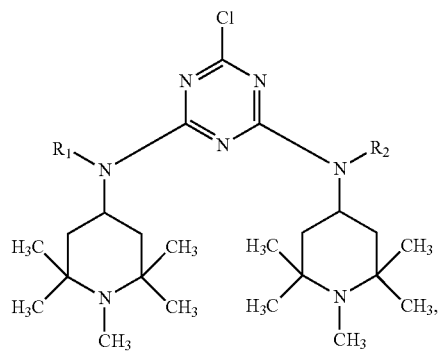

(1)

wherein $R_1$ and $R_2$ are independently from each other $C_1$-$C_8$alkyl, comprising reacting a compound of formula

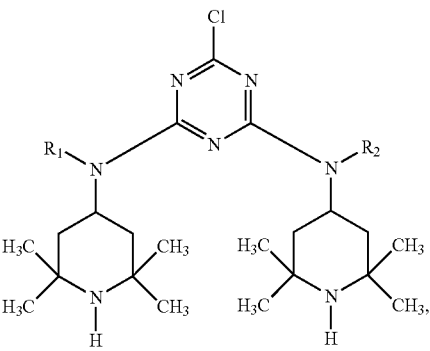

(2)

with a formaldehyde source in presence of a palladium or platinum catalyst at a hydrogen pressure of $5 \times 10^8$ mPa to $200 \times 10^8$ mPa.

2. The process according to claim 1, wherein $R_1$ and $R_2$ are independently from each other $C_1$-$C_4$ alkyl.

3. The process according to claim 1, wherein the formaldehyde source is paraformaldehyde or formaldehyde.

4. The process according to claim 1, wherein the process is carried out at a temperature of 50 to 180° C.

5. The process according to claim 1, wherein the process is carried out at a temperature of 80 to 150° C.

6. The process according to claim 1, wherein a palladium or platinum catalyst supported on a carbon carrier is used.

7. The process according to claim 1, wherein a palladium catalyst supported on a carbon carrier is used.

8. The process according to claim 1, wherein a platinum catalyst supported on a carbon carrier is used.

9. The process according to claim 1, wherein 2 to 15 weight-% of the catalyst is used, based on the weight of the compound of formula (2).

10. The process according to claim 1, wherein the reaction is carried out in presence of a solvent.

11. The process according to claim 10, wherein the solvent is water, hexane, methanol, toluene or xylene.

12. A method for the preparation of compounds of formula

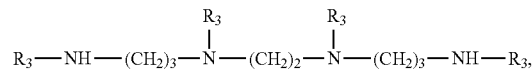

(3)

wherein $R_3$ is a group of formula

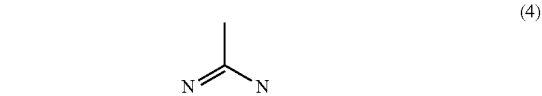

(4)

comprising reacting compounds of formula (1), according to claim 1, with a compound of formula

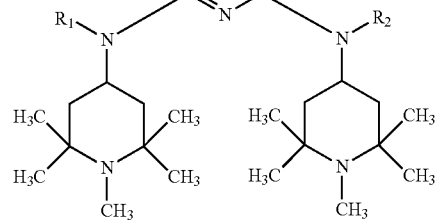

$NH_2$—$(CH_2)_3$—NH—$(CH_2)_2$—NH—$(CH_2)_3$—$NH_2$ (6), or for the preparation of compounds of formula

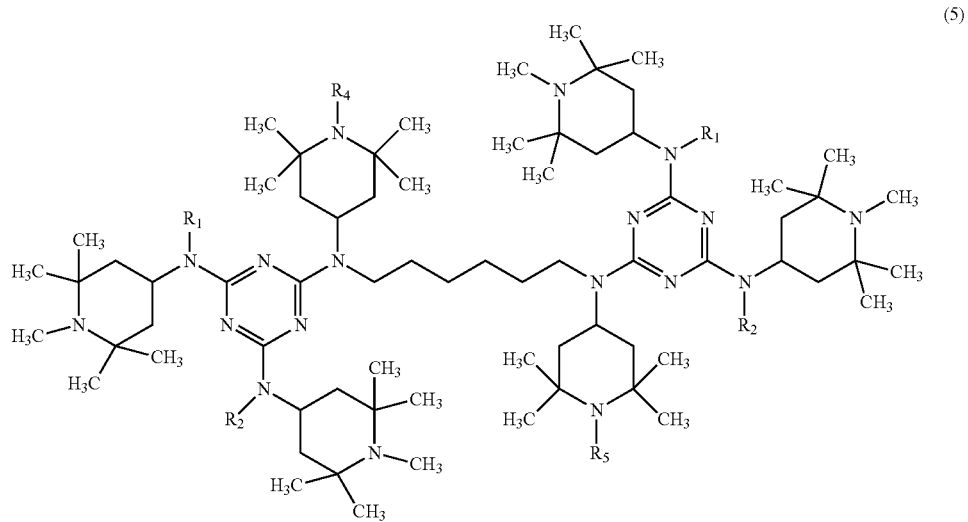

(5)

and wherein $R_1$ and $R_2$ are as defined in claim 1, and $R_4$ and $R_5$ are hydrogen or methyl,
comprising reacting compounds of formula (1), according to claim 1, with a compound of formula

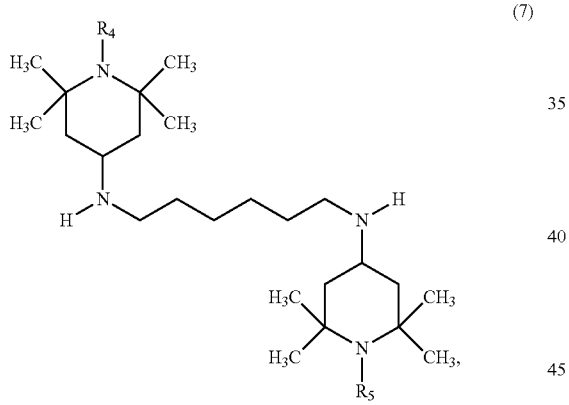

(7)

wherein $R_4$ and $R_5$ are hydrogen or methyl.

13. The process according to claim 1, wherein $R_1$ and $R_2$ are butyl.

14. The process according to claim 10, wherein the solvent is methanol.

15. The process according to claim 10, wherein the solvent is toluene.

16. The process according to claim 10, wherein the solvent is xylene.

17. The process according to claim 12, wherein the reaction is carried out in presence of a solvent.

18. The process according to claim 17, wherein the solvent is toluene, xylene or trimethylbenzene.

\* \* \* \* \*